US011148343B2

(12) United States Patent
Takehana

(10) Patent No.: US 11,148,343 B2
(45) Date of Patent: Oct. 19, 2021

(54) DIE UNIT FOR BLOW MOLDING, AND BLOW MOLDING DEVICE

(71) Applicant: NISSEI ASB MACHINE CO., LTD., Nagano (JP)

(72) Inventor: Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 16/632,123

(22) PCT Filed: Jul. 20, 2018

(86) PCT No.: PCT/JP2018/027406
§ 371 (c)(1),
(2) Date: Jan. 17, 2020

(87) PCT Pub. No.: WO2019/017494
PCT Pub. Date: Jan. 24, 2019

(65) Prior Publication Data
US 2020/0171735 A1    Jun. 4, 2020

(30) Foreign Application Priority Data

Jul. 21, 2017    (JP) .............................. JP2017-142241

(51) Int. Cl.
*B29C 49/48* (2006.01)
*B29C 49/56* (2006.01)
(Continued)

(52) U.S. Cl.
CPC .............. *B29C 49/36* (2013.01); *B29C 49/48* (2013.01); *B29L 2031/712* (2013.01)

(58) Field of Classification Search
CPC .. B29C 49/48; B29C 2049/4869; B29C 49/56
See application file for complete search history.

(56) References Cited

U.S. PATENT DOCUMENTS

| 4,484,884 A | 11/1984 | Wiatt et al. | |
| 8,944,806 B2 * | 2/2015 | Yokobayashi | .......... B29C 49/70 |
| | | | 425/525 |

(Continued)

FOREIGN PATENT DOCUMENTS

| CN | 102211396 A | 10/2011 |
| CN | 103124627 | 5/2013 |

(Continued)

OTHER PUBLICATIONS

Official Communication (ISA 210) issued in International Patent Application No. PCT/JP2018/027406, dated Aug. 21, 2018.

(Continued)

*Primary Examiner* — Robert B Davis
(74) *Attorney, Agent, or Firm* — Greenblum & Bernstein P.L.C.

(57) ABSTRACT

The present application provides: first base members that respectively hold split molds disposed at both ends in a second direction, and are fixed to a mold clamping plate; second base members disposed between the first base members and having the split molds other than the split molds fixed to the first base members fixed thereto; and coupling members that couple the first base members and the second base members in a state that allows each of the pair of split molds to come into contact or separate. The present invention is configured such that the plurality of second base members follow the movement of the first base members.

11 Claims, 12 Drawing Sheets

(51) Int. Cl.
    *B29C 49/36* (2006.01)
    *B29L 31/00* (2006.01)

(56) References Cited

U.S. PATENT DOCUMENTS

| | | | |
|---|---|---|---|
| 2009/0057953 A1* | 3/2009 | Vassar | B29C 49/56 264/297.8 |
| 2012/0294974 A1 | 11/2012 | Yokobayashi et al. | |
| 2013/0241118 A1 | 9/2013 | Sato et al. | |
| 2014/0099396 A1 | 4/2014 | Yokobayashi et al. | |
| 2014/0124988 A1* | 5/2014 | Hirdina | B29C 49/4284 264/523 |
| 2014/0255533 A1 | 9/2014 | Yokobayashi et al. | |
| 2015/0140159 A1 | 5/2015 | Yokobayashi et al. | |
| 2015/0290865 A1 | 10/2015 | Horigome et al. | |
| 2018/0169926 A1 | 6/2018 | Oike | |
| 2019/0022914 A1 | 1/2019 | Horigome et al. | |
| 2019/0047203 A1 | 2/2019 | Oike | |

FOREIGN PATENT DOCUMENTS

| | | |
|---|---|---|
| EP | 0525727 A1 | 2/1993 |
| JP | 47-24699 | 8/1972 |
| JP | 59-67020 | 4/1984 |
| JP | 9-24540 | 1/1997 |
| JP | 2011-156728 A | 8/2011 |
| JP | 2013-86355 | 5/2013 |
| JP | 2013-107391 | 6/2013 |
| WO | 2016/147981 A1 | 9/2016 |

OTHER PUBLICATIONS

Official Communication (ISA 237) issued in International Patent Application No. PCT/JP2018/027406, dated Aug. 21, 2018.
Office Action issued in Taiwan Counterpart Patent Appl. No. 107125325, dated Mar. 6, 2019, along with an English translation thereof.
Office Action in IN counterpart patent application No. 202027002369, dated Mar. 16, 2021.
Extended European Search Report in EP counterpart patent application No. 18835743.8, dated Mar. 17, 2021.
Chinese Office Action of corresponding Chinese patent application No. 201880048779.0, dated Mar. 30, 2021, along with English translation.
Office Action issued in Republic of Korea Counterpart Patent Appl. No. 10-2020-7001803, dated May 18, 2021, along with an English translation thereof.

* cited by examiner

[FIG.1]
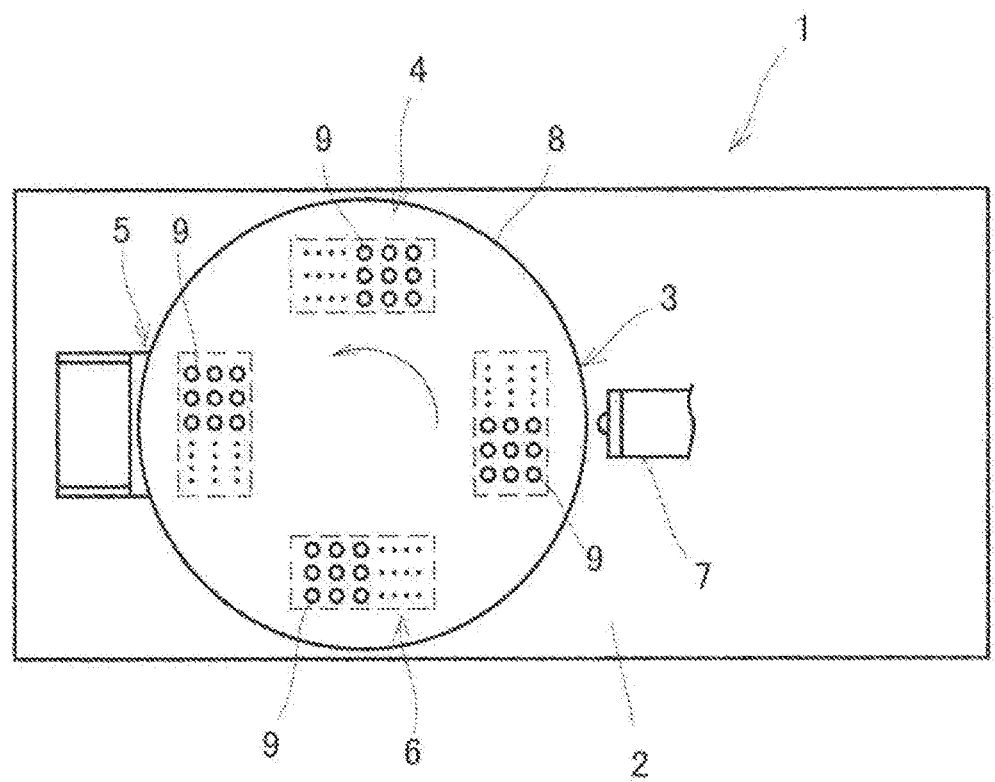

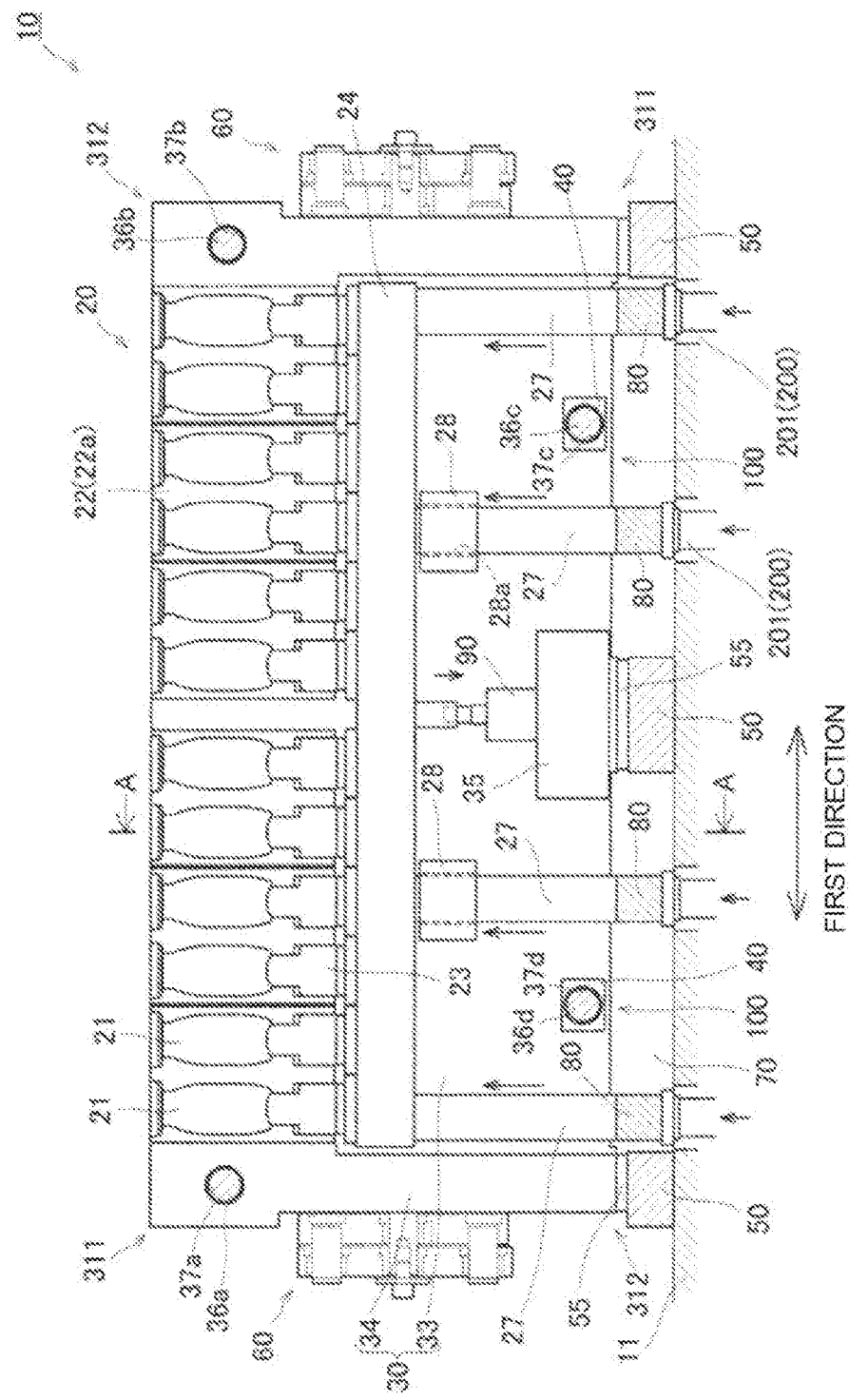
[FIG. 2]

[FIG.3]
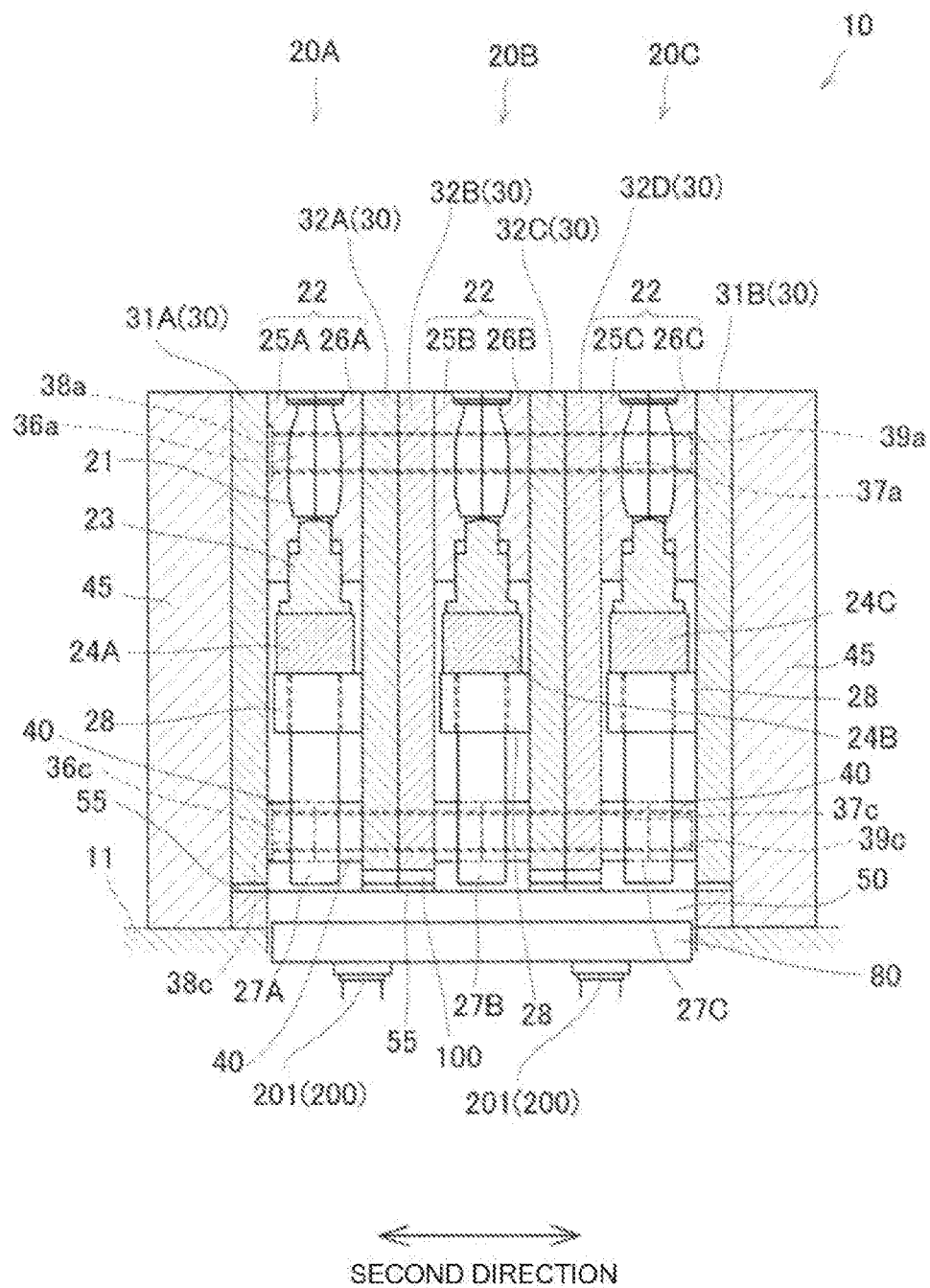
SECOND DIRECTION

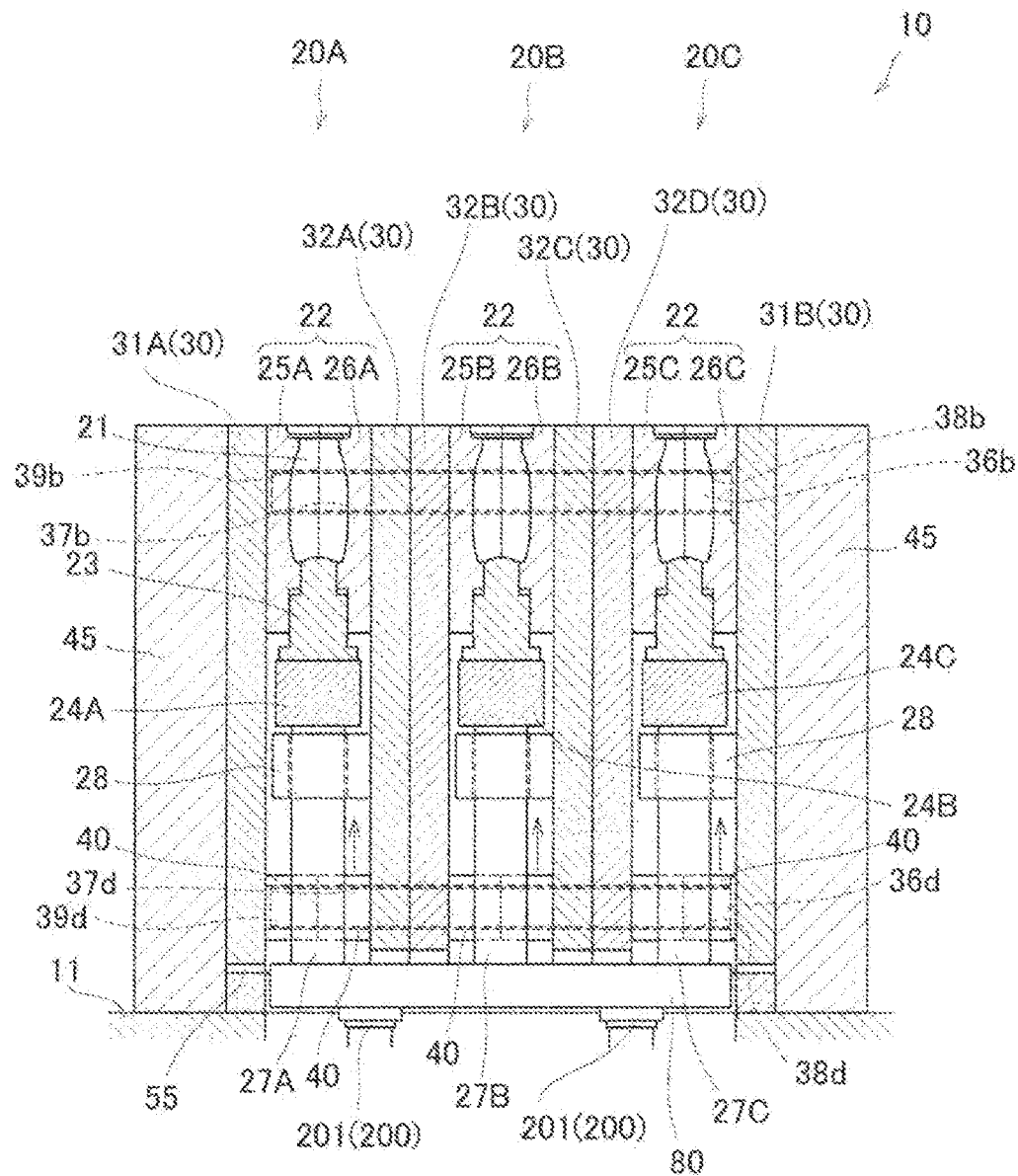
[FIG.4]

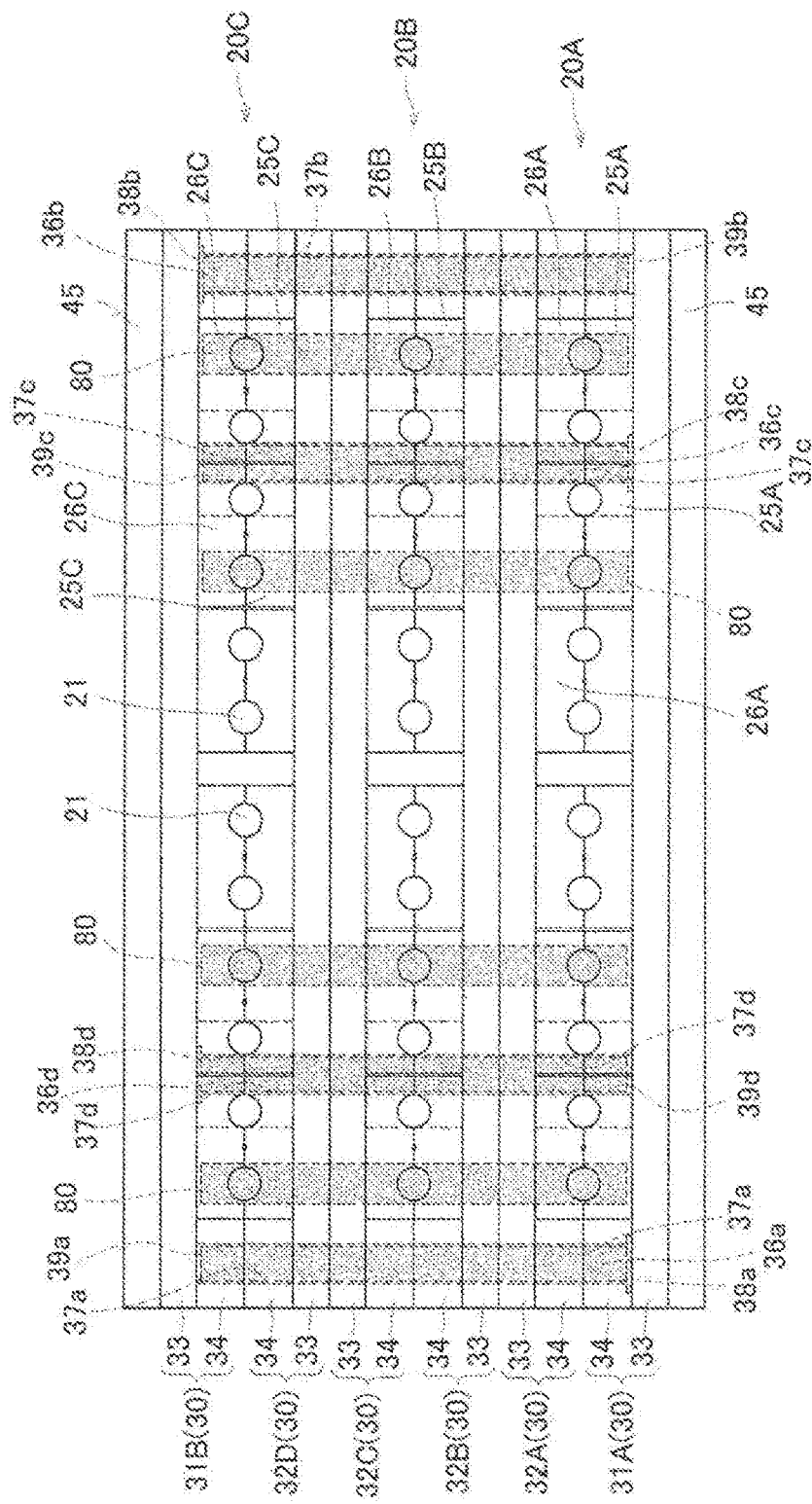
[FIG. 5]

[FIG.6]
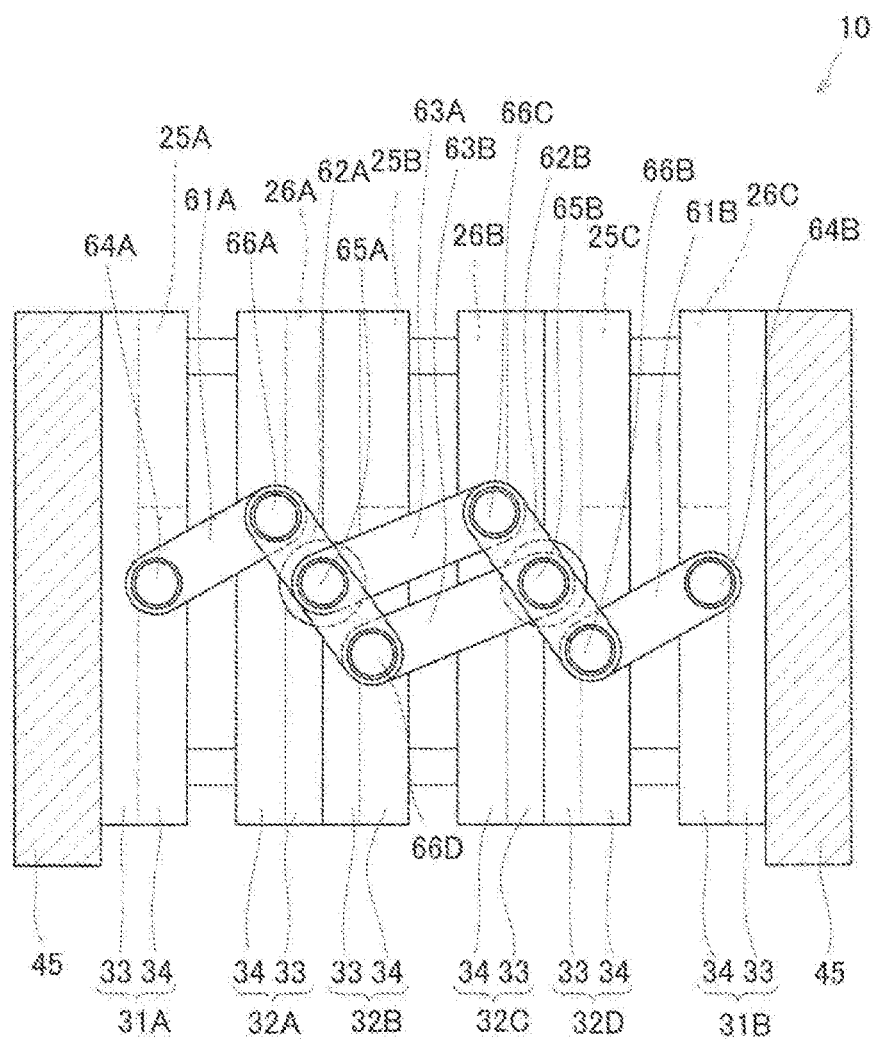

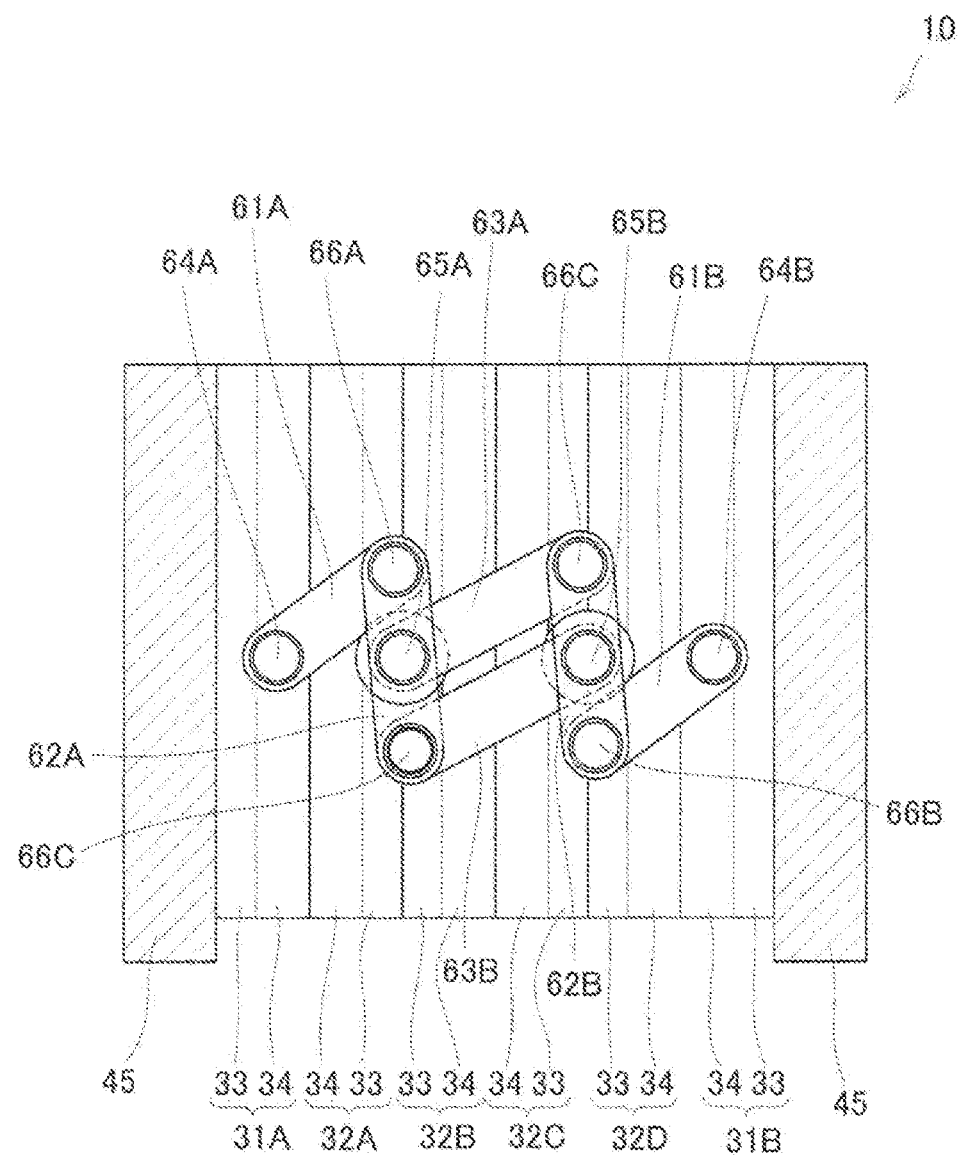
[FIG.7]

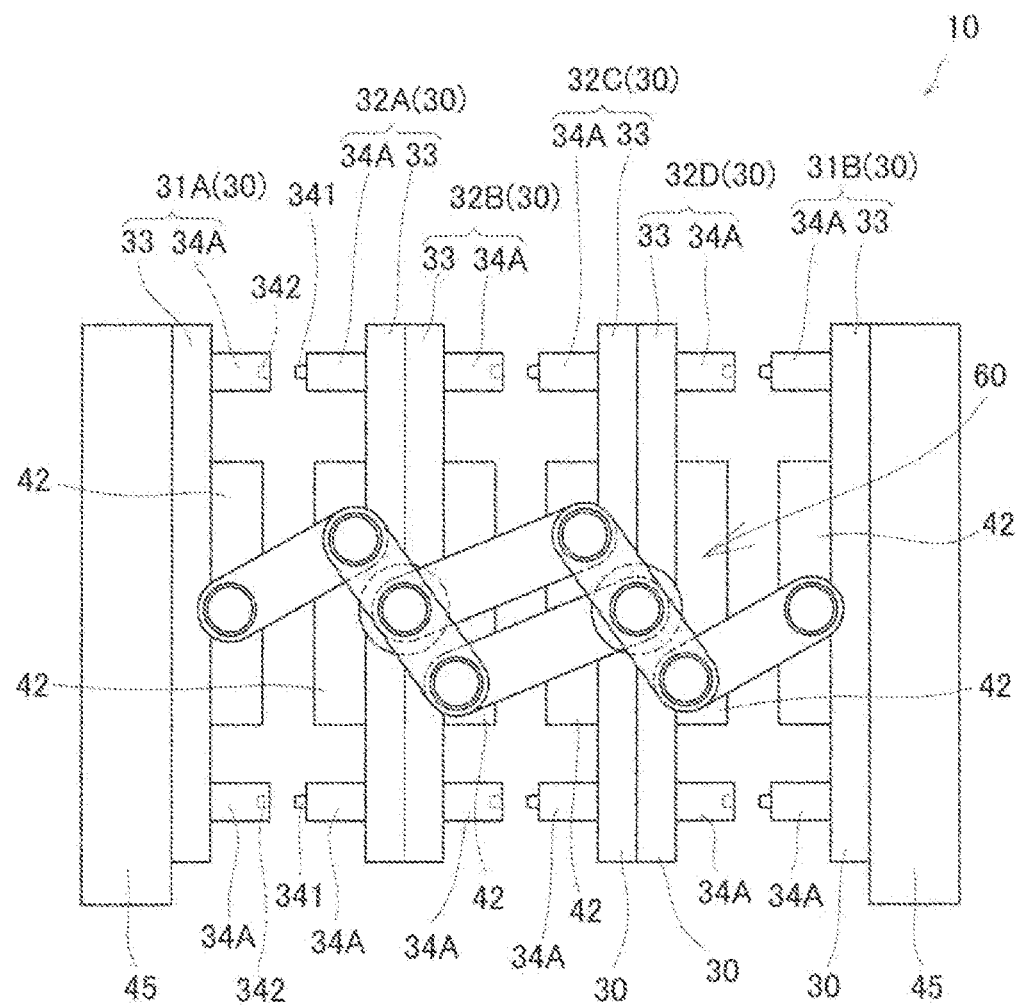
[FIG.8]

[FIG.9]
(a)
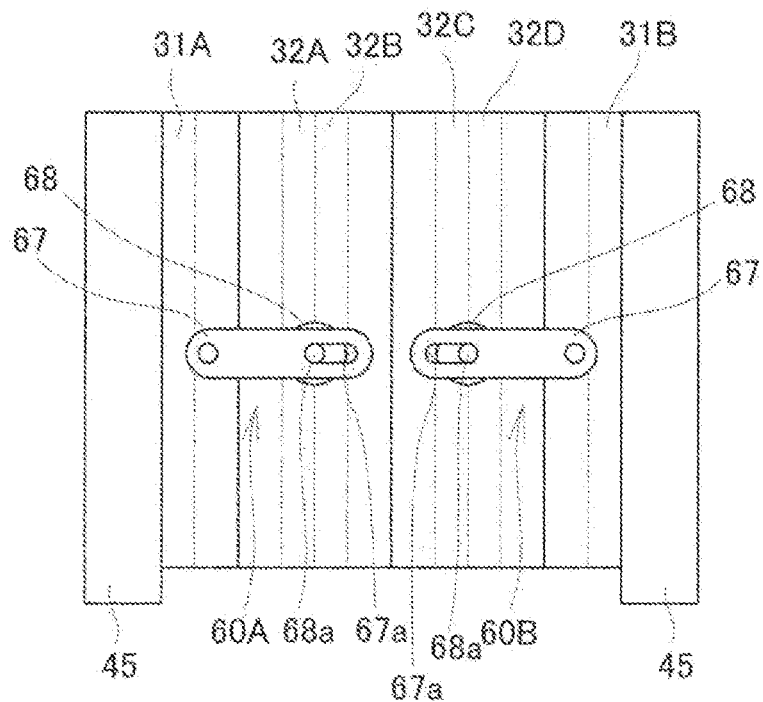
(b)
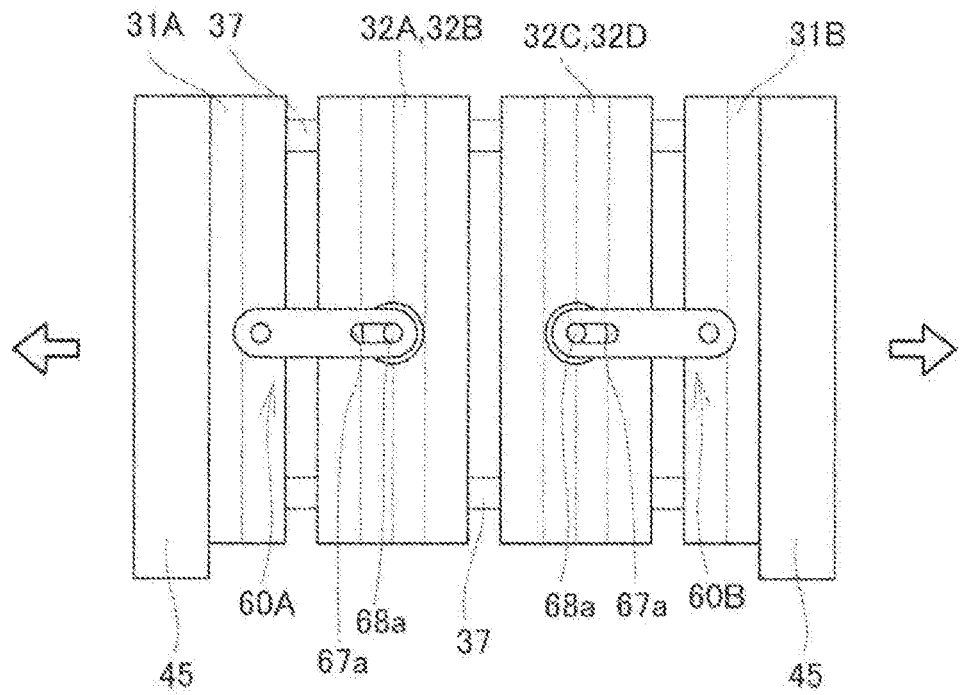

[FIG.10]
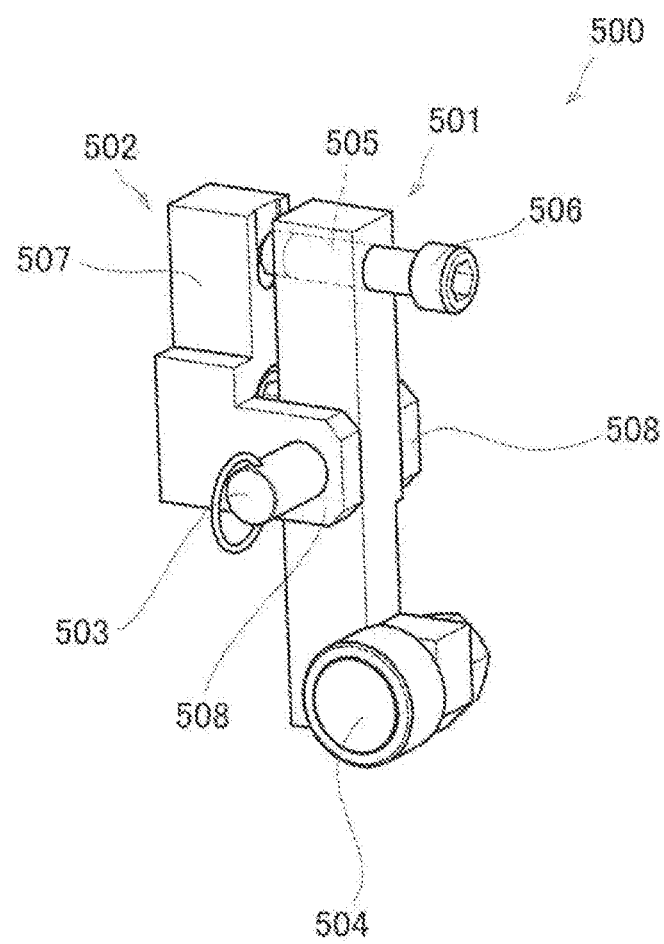

[FIG.11]
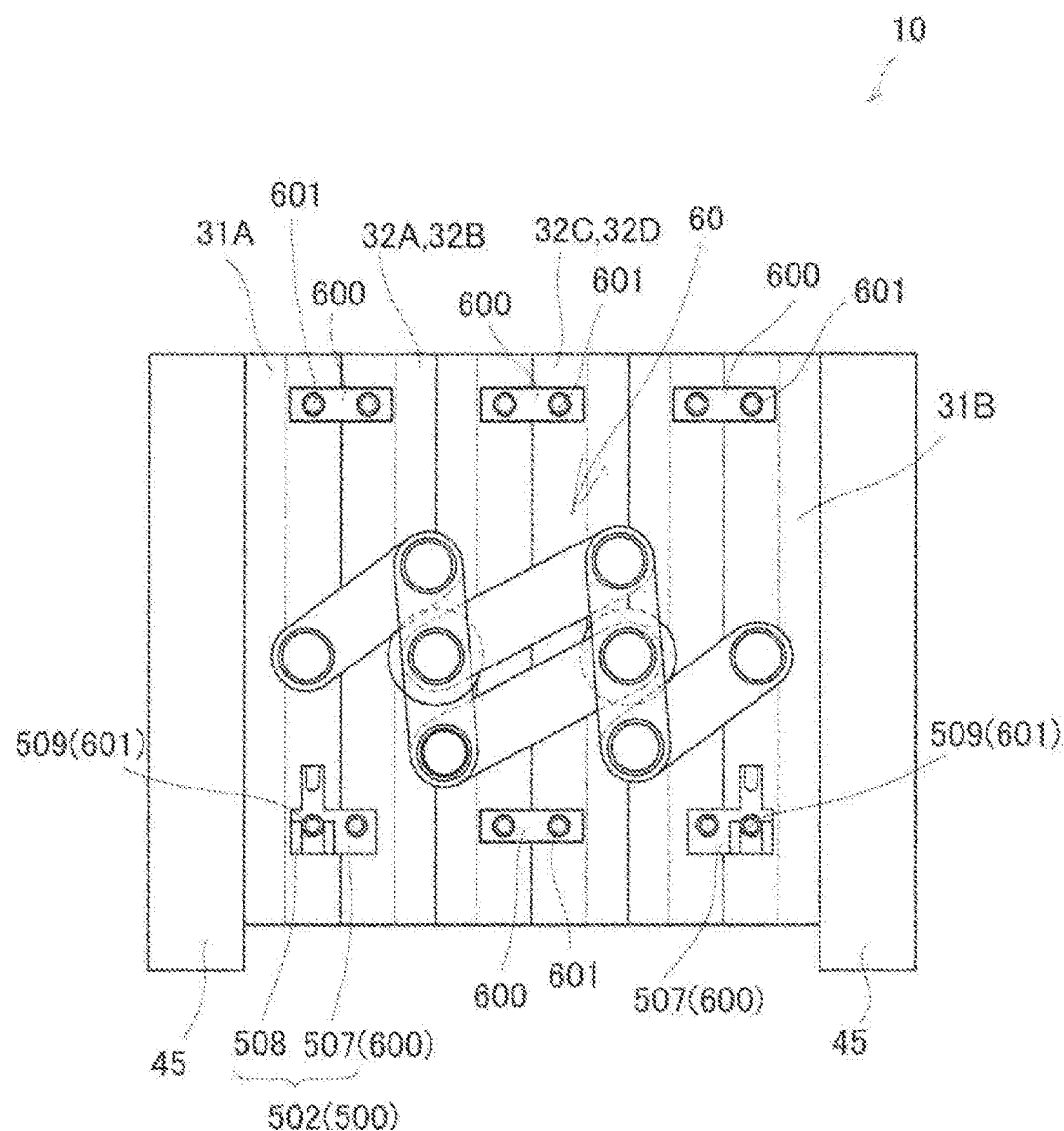

[FIG.12]
(a)
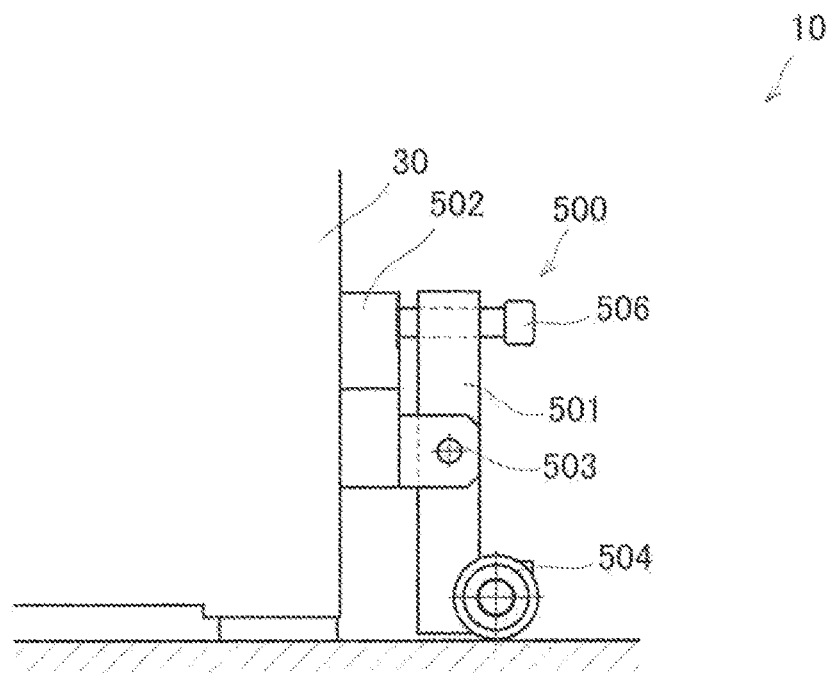
(b)
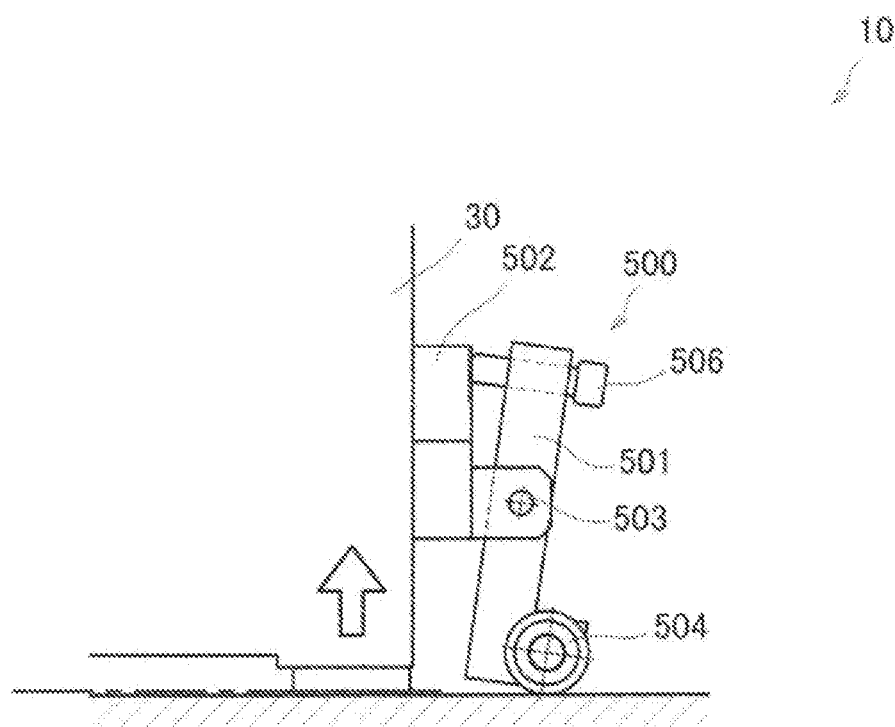

DIE UNIT FOR BLOW MOLDING, AND BLOW MOLDING DEVICE

TECHNICAL FIELD

The present invention relates to a blow molding mold unit that blow-molds a plurality of resin products such as containers simultaneously, and a blow molding device including the blow molding mold unit.

BACKGROUND ART

As a method of manufacturing a resin product such as a container, a method in which a preform (a parison) is formed by injection molding or extrusion molding and this preform is blow-molded to form a container is known in related art.

Specifically, for example, there is a technique in which a preform is arranged in a molding space (a cavity) formed by a blow mold of a blow mold unit, and the preform is blow-molded in the cavity to be expanded to form a container (for example, see Patent Literature 1).

CITATION LIST

Patent Literature

Patent Literature 1: JP-A-2013-107391

SUMMARY OF INVENTION

Technical Problem

There are two types of blow molding methods, namely, a hot parison method in which a preform is blow-molded by using retained heat (internal heat) during injection molding without being cooled to room temperature, and a cold parison method in which a preform is cooled once to room temperature and then reheated and blow-molded.

A so-called one-step type blow molding device that performs blow molding by the hot parison method has an advantage that containers of various shapes having high design properties can be manufactured, as compared with a so-called two-step type blow molding device that performs blow molding using the cold parison method.

However, in terms of productivity (production amount), the one-step type blow molding device is inferior to the two-step type blow molding device, and has a disadvantage that manufacturing cost increases accordingly.

In recent years, in order to improve the productivity (the production amount) of the one-step type blow molding device, the device in which blow molds (cavities) are arranged in two rows has been put into practical use, but further improvement in the productivity (the production amount) is desired.

The present invention has been made in view of the above circumstances, and an object thereof is to provide a blow molding mold unit and a blow molding device capable of improving productivity.

Solution to Problem

According to an aspect of the present invention for solving the above problem, there is provided a blow molding mold unit that includes a blow mold including: a pair of split molds forming a plurality of cavities arranged in a row in a first direction; a plurality of bottom molds respectively corresponding to the cavities; and a bottom mold fixing plate to which the plurality of bottom molds are fixed. The blow molding mold unit includes: a plurality of the blow mold arranged in a second direction perpendicular to the first direction; first base members holding split molds that are arranged at both end positions in the second direction, and fixed to a mold clamping plate; second base members arranged between the first base members, and to which split molds other than the split mold fixed to the first base members are fixed; and a coupling member configured to couple the first base members and the second base members in a state where the pair of split molds are contactable with and separable from each other, and the second base members are configured to move in accordance with movement of the first base members.

According to the present invention, the blow molding mold unit in which three or more rows of blow molds (cavities) are arranged can be implemented.

Here, the second base members preferably hold two adjacent split molds in a back-to-back state. Thereby, the split molds can be more appropriately moved, and the size of the device can be reduced.

The blow molding mold unit preferably includes: a push-up rod hanging down from the bottom mold fixing plate of each of the blow molds; and a push-up member configured to be coupled to a lifting device and extending along the second direction below the second base members, and the push-up member is abuttable against a lower end of the push-up rod of each of the plurality of the blow molds Preferably, a plurality of the push-up rods are provided to each bottom mold fixing plate in the first direction, and a plurality of the push-up members are provided corresponding to the plurality of the push-up rods.

With such a configuration, the plurality of the bottom molds can be moved at a time by a relatively simple structure.

Preferably, the push-up rod and the push-up member are arranged such that a gap is formed therebetween when the push-up rod and the push-up member are lowered. Thereby, work of attaching and detaching components such as the push-up member to and from the blow molding mold unit is facilitated.

The blow molding mold unit preferably includes a lowering device configured to lower the bottom mold fixing plate. In this case, in particular, the lifting device is preferably configured to lift the push-up member by a hydraulic pressure, and the lowering device is preferably configured to lower the bottom mold fixing plate by a pneumatic pressure. Thereby, the bottom mold fixing plate can be lifted and lowered more appropriately. That is, the plurality of the bottom molds can be appropriately lifted and lowered at one time.

A bottom portion of the second base members is preferably provided with a notch at a position corresponding to the push-up member. Thereby, a movement range of the push-up member in an upper-lower direction can be sufficiently ensured.

According to another aspect of the present invention, there is provided a blow molding device including the blow molding mold unit as described above. According to such a blow molding device, productivity of resin products can be improved, and cost can be reduced accordingly.

Advantageous Effects of Invention

According to the present invention, it is possible to implement a blow molding mold unit in which blow molds (cavities) are arranged in three or more rows and productivity of resin products is improved, and a blow molding device. In addition, manufacturing cost can be reduced with the improvement in productivity. For example, even in a one-step type blow molding device, by adopting the blow molding mold unit according to the present invention, the productivity can be improved and the manufacturing cost can be reduced.

BRIEF DESCRIPTION OF DRAWINGS

FIG. 1 is a view showing a schematic configuration of a blow molding device according to the present invention.

FIG. 2 is a view showing a blow molding mold unit according to an embodiment of the present invention.

FIG. 3 is a cross-sectional view of the blow molding mold unit according to the embodiment of the present invention.

FIG. 4 is a cross-sectional view of the blow molding mold unit according to the embodiment of the present invention.

FIG. 5 is a top view of the blow molding mold unit according to the embodiment of the present invention.

FIG. 6 is a side view of the blow molding mold unit according to the embodiment of the present invention.

FIG. 7 is a side view of the blow molding mold unit according to the embodiment of the present invention.

FIG. 8 is a side view showing a modification of the blow molding mold unit according to the embodiment of the present invention.

FIG. 9 is a side view showing a modification of the blow molding mold unit according to the embodiment of the present invention.

FIG. 10 is a perspective view showing an example of a movement jig according to the embodiment of the present invention.

FIG. 11 is a view showing the movement jig and a coupling jig according to the embodiment of the present invention.

FIG. 12 is a view showing an operation method of the movement jig according to the embodiment of the present invention.

DESCRIPTION OF EMBODIMENTS

Hereinafter, an embodiment of the present invention will be described in detail with reference to the drawings.

FIG. 1 is a view showing a schematic configuration of a blow molding device according to the present invention. FIG. 2 is a view showing a parting surface of a blow cavity mold fixed to a second blow base, which is a blow molding mold unit of the blow molding device. FIGS. 3 and 4 are cross-sectional views taken along line A-A in FIG. 2. FIGS. 3 and 4 are views showing a state in which the blow cavity mold is mold-closed. FIG. 3 is a view showing a state in which a bottom mold is lowered, and FIG. 4 is a view showing a state in which the bottom mold is lifted.

FIG. 5 is a top view of the blow molding mold unit. FIGS. 6 and 7 are side views of the blow molding mold unit showing a coupling member. FIG. 6 is a view showing a state in which the blow cavity mold is mold-opened, and FIG. 7 is a view showing a state in which the blow cavity mold is mold-closed. FIGS. 2 and 5 show a state in which the blow cavity mold is mold-closed.

FIGS. 8 and 9 are side views showing modifications of the blow molding mold unit. FIGS. 10 to 12 are views showing a movement jig and a coupling jig that are detachably provided to the blow molding mold unit.

First, the schematic configuration of the blow molding device including the blow molding mold unit according to the present invention will be described with reference to FIG. 1.

As shown in FIG. 1, the blow molding device 1 is, for example, a one-step type device to manufacture a resin product (a container) such as a PET bottle, and includes an injection molding unit 3, a temperature adjustment unit 4, a blow molding unit 5 and a removing unit 6 on a machine base 2.

A nozzle of an injection device 7 is coupled to the injection molding unit 3, and a preform is molded by the injection molding unit 3. Temperature of the preform is adjusted to a desired temperature by the temperature adjustment unit 4. By the blow molding unit 5, the preform whose temperature is adjusted is blow molded by, for example, high-pressure air to form a container as a final molded product. The container formed in this way is removed to outside by the removing unit 6.

A rotation disk 8 is provided above the injection molding unit 3, the temperature adjustment unit 4, the blow molding unit 5 and the removing unit 6. The rotation disk 8 is intermittently rotatable, for example, in a counterclockwise direction with respect to the machine base 2 in a top view. Lip molds 9 are provided at four positions in a circumferential direction of the rotation disk 8. The preform and the container are held by the lip molds 9 and are sequentially conveyed to a predetermined device by intermittent rotation of the rotation disk 8.

As a configuration of the blow molding device 1, a four-station type in which the lip molds 9 are intermittently rotated by 90° by the rotation disk 8 is illustrated, but the blow molding device is not limited to this configuration. The blow molding device may be, for example, a three-station type configuration in which the injection molding unit, the blow molding unit and the removing unit are provided and the lip molds are intermittently rotated by 120° in the rotation disk. The blow molding device may be a two-station type configuration in which the injection molding unit and the blow molding unit are provided and the lip molds are intermittently rotated by 180° in the rotation disk, or a linear configuration without the rotation disk.

The present invention is characterized by the blow molding mold unit provided in the blow molding unit 5 of the blow molding device 1. Hereinafter, the blow molding mold unit will be described in detail with reference to FIGS. 2 to 7.

As shown in FIGS. 2 to 5, the blow molding unit 5 includes a blow molding mold unit 10 provided on a base board 11. The blow molding mold unit 10 includes a plurality of blow molds 20.

Each blow mold 20 includes: a blow cavity mold 22 having a plurality of cavities 21 arranged in a row in a first direction along a parting surface 22a; bottom molds 23, each of which closes a bottom portion of each cavity 21 to form a bottom surface (a raised bottom) of the container as the final molded product; and a bottom mold fixing plate 24 to which the bottom molds 23 are fixed. Although not shown, the blow mold 20 includes a blow core mold, which is inserted into the preform arranged in the cavity 21 and introduces air inside, above the blow cavity mold 22.

The plurality of bottom molds 23 provided in a row corresponding to the cavities 21 of the blow cavity mold 22 are fixed to the bottom mold fixing plate 24. That is, the plurality of bottom molds 23 is integrated by the bottom mold fixing plate 24.

In the present embodiment, at least three blow molds 20 having such a configuration are arranged side by side in a second direction perpendicular to the first direction, which is an arrangement direction of the cavities 21. In other words, the blow molding mold unit 10 includes the blow molds 20 arranged in at least three rows in the second direction. That is, in the blow molding mold unit 10, the plurality of cavities 21 (the blow cavity molds 22) are arranged in at least three rows in the second direction.

Specifically, the blow cavity mold 22 of each blow mold 20 includes a first split mold 25 (25A to 25C) and a second split mold 26 (26A to 26C) that are a pair of split molds mold-clamped by abutting parting surfaces 22a against each other. In the present embodiment, each of the first split mold 25 and the second split mold 26 has two cavities 21. The blow cavity molds 22 include a plurality of (for example, six) the first split molds 25 and the second split molds 26 arranged side by side in a row.

The first split molds 25 and the second split molds 26 are fixed to a blow base 30. The blow base 30 includes first blow bases (first base members) 31 and second blow bases (second base member) 32 that are movable in the second direction while holding the first split molds 25 or the second split molds 26.

The first blow bases 31 (31A, 31B) are respectively arranged on both outer sides (both end positions) of the blow molding mold unit 10 in the second direction. Among the first split molds 25 and the second split molds 26 of the three blow molds 20 (20A to 20C), the first split mold 25A and the second split mold 26C located at both end position in the second direction are fixed to the first blow bases 31. In the present embodiment, a plurality of the first split molds 25A are fixed to the first blow base 31A, and a plurality of the second split molds 26C are fixed to the first blow base 31B.

A surface of the first blow base 31A opposite to the first split molds 25A is fixed to a mold clamping plate 45. Similarly, a surface of the first blow base 31B opposite to the second split mold 26C is fixed to the mold clamping plate 45.

Although not shown, a drive device including, for example, a hydraulic cylinder or an electric motor (an actuator) is connected to a surface of each mold clamping plate 45 opposite to the first blow base 31. Each mold clamping plate 45 is configured to be slidable in the second direction together with the first blow base 31 by the drive device. That is, by operating the drive device, the first split mold 25A and the second split mold 26C fixed to the first blow base 31 are slidably moved (forward and backward) together with the mold clamping plate 45.

On the other hand, a plurality of the second blow bases 32 are arranged between the first blow bases 31A, 31B, and split molds other than the first split mold 25A and the second split mold 26C that are fixed to the first blow bases 31 are fixed to the second blow bases 32, respectively. That is, the first split molds 25B, 25C and the second split molds 26A, 26B are fixed to the second blow bases 32, respectively. In the present embodiment, the first split molds 25B, 25C and the second split molds 26A, 26B are fixed to four second blow bases 32 (32A to 32D), respectively.

The two split molds adjacent in the second direction are held by the second blow bases 32 in a back-to-back state. Specifically, the second blow base 32A and the second blow base 32B are fixed and integrated by a fastening member such as a bolt (not shown), and the second split mold 26A and the first split mold 25B, which are adjacent with each other, are held in the back-to-back state. Similarly, the second blow base 32C and the second blow base 32D are fixed and integrated by a fastening member such as a bolt, and the second split mold 26B and the first split mold 25C, which are adjacent with each other, are held in the back-to-back state.

In the present embodiment, the two second blow bases 32 are fixed by the fastening member such as the bolt, so that the adjacent split molds are held in the back-to-back state. However, the adjacent split molds may be fixed to both surfaces of one second blow base 32.

Each blow base 30 (the first blow base 31 and the second blow base 32) includes: a substantially flat plate-shaped fixing member 33 to which a surface of the first split mold 25 or the second split mold 26 opposite to the cavity 21 is fixed; and a substantially flat plate-shaped first pressure receiving member 34 provided to both side portions of the fixing member 33. The first pressure receiving member 34 is provided to both outer sides of the blow mold 20 in the arrangement direction (the first direction) of the blow mold 20. When the blow mold 20 is mold-clamped, the first pressure receiving members 34 facing each other abut against each other and receive a mold clamping force.

A second pressure receiving member 35 that receives a mold clamping force together with the first pressure receiving member 34 is provided to one of the blow bases 30 to which the pair of first split mold 25 and the second split mold 26 is fixed. In the present embodiment, the second pressure receiving member 35 is provided to each of the first blow base 31A, the second blow base 32B and the second blow base 32D (see FIG. 2).

The second pressure receiving member 35 is fixed to the fixing member 33 constituting the blow base 30 on a lower side of the blow mold 20. Although arrangement of the second pressure receiving member 35 is not particularly limited, the second pressure receiving member 35 is arranged substantially at a center portion of the blow base 30 in the second direction in the present embodiment.

When the blow mold 20 is mold-clamped (mold-closed), a tip end surface of the second pressure receiving member 35 abuts against the fixing member 33 of a facing blow base 30 (a blow base to which the second pressure receiving member 35 is not fixed), thereby receiving the mold clamping force together with the first pressure receiving member 34.

A structure of each of the blow bases 30 (the first blow base 31 and the second blow base 32) is not limited to the above, and for example, the fixing member 33 and the first pressure receiving member 34 may be formed integrally. That is, the blow base 30 may be formed so as to surround three sides of the first split mold 25 and the second split mold 26 (the blow cavity mold 22) arranged in a row.

Similarly, a structure of the second pressure receiving member 35 is not limited to a rectangular block shape as shown in FIG. 2. An outer shape of the second pressure receiving member 35 may be cylindrical instead of rectangular. The second pressure receiving member 35 is not limited to the structure that the second pressure receiving member 35 is fixed to only one of the blow bases 30 as described above. For example, similarly to a guide block 40 described below, the second pressure receiving member 35 may be provided dividedly in each of the two blow bases 30 facing each other. The number of the second pressure receiving members 35 to be fixed to the blow base 30 is not required to be one, and may be plural.

Here, a plurality of spacers 50 are provided on the base board 11 of the blow molding mold unit 10. The spacers 50 are provided continuously over a movement range of the second blow base 32 in the second direction. In the present embodiment, the spacers 50 are provided at three positions, namely, at a center portion and both end portions of the blow mold 20 in the first direction. The number and arrangement of the spacers 50 are not particularly limited, and may be appropriately determined in consideration of the movement range of each blow base 30, a size of the blow cavity mold 22 and the like.

Each of the blow bases 30 (the first blow base 31 and the second blow base 32) is slidably provided on the spacer 50. In the present embodiment, a slide metal 55 formed of, for example, an oil-containing metal is fixed to a lower surface of each blow base 30. Since the slide metal 55 is provided, frictional resistance when the blow base 30 slides on the spacer 50 can be reduced.

The above-described first blow base 31A, the second blow bases 32A, 32B, the second blow bases 32C, 32D, and the first blow base 31B are coupled by coupling members 60. That is, the coupling members 60 couple the first blow base 31A, the second blow bases 32A, 32B, the second blow bases 32C, 32D, and the first blow base 31B in a state where the first split mold 25 and the second split mold 26 constituting each blow cavity mold 22 are contactable with and separable from each other. Although two coupling members 60 are provided on both side surfaces of the blow molding mold unit 10 in the present embodiment, the coupling member 60 may be provided on one side surface of the blow molding mold unit 10.

As shown in FIGS. 6 and 7 in the present embodiment, the coupling member 60 includes a first link arm 61 (61A, 61B), a second link arm 62 (62A, 62B), a third link arm 63 (63A, 63B), a first shaft member 64 (64A, 64B), a second shaft member 65 (65A, 65B), and a rotation member 66 (66A to 66D).

One end of the first link arm 61A is rotatably attached to the first blow base 31A by the first shaft member 64A. A center portion of the second link arm 62A is rotatably attached to the second blow base 32A, 32B by the second shaft member 65A, and one end of the second link arm 62A is rotatably coupled to the first link arm 61A by the rotation member 66A.

One end of the first link arm 61B is rotatably attached to the first blow base 31B by the first shaft member 64B. A center portion of the second link arm 62B is rotatably attached to the second blow base 32C, 32D by the second shaft member 65B, and one end of the second link arm 62B is rotatably coupled to the first link arm 61B by the rotation member 66B.

The second link arm 62A and the second link arm 62B are coupled by the third link arm 63. That is, one end of the third link arm 63A is rotatably coupled to the second link arm 62A by the second shaft member 65A, and the other end of the third link arm 63A is rotatably coupled to the other end of the second link arm 62B by the rotation member 66C. Similarly, one end of the third link arm 63B is rotatably coupled to the second link arm 62B by the second shaft member 65B, and the other end of the third link arm 63B is rotatably coupled to the other end of the second link arm 62A by the rotation member 66D. That is, the coupling member 60 constitutes a parallel link mechanism having a substantially parallelogram shape.

In such a configuration, when the mold clamping plate 45 is pressed by the drive device (not shown) from an mold-opened state of the blow cavity mold 22 (see FIG. 6), the first blow base 31 moves together with the mold clamping plate 45. That is, the first split mold 25A and the second split mold 26C move together with the mold clamping plate 45.

The coupling member 60 serving as the link mechanism is deformed (expanded and contracted) in accordance with movement of the first blow base 31, and each second blow base 32 moves in accordance with the deformation of the coupling member 60. That is, the first split molds 25B, 25C and the second split molds 26A, 26B move in accordance with movement of the first split mold 25A and the second split mold 26C. Thereby, the blow cavity mold 22 is brought into a mold-closed state (see FIG. 7).

Also, when the mold clamping plate 45 is pulled outward by the drive device from the mold-closed state of the blow cavity mold 22, the first blow base 31 moves together with the mold clamping plate 45, and the second blow base 32 moves in accordance with this movement. That is, the first split mold 25A and the second split mold 26C move together with the mold clamping plate 45, and the first split molds 25B, 25C and the second split molds 26A, 26B move in accordance with this movement. Thereby, the blow cavity mold 22 is brought into the mold-opened state (see FIG. 6).

In this way, according to the coupling member 60 described above, during mold opening and closing operation of the cavity mold 22, all the blow bases (base members) 30 to which the blow mold 20 (the first split mold 25 and the second split mold 26) is fixed can be synchronously moved (forward and backward). Therefore, at any timing during the mold opening and closing operation of the cavity mold 22, mold opening strokes of all the blow molds 20 can be matched, and the largest opening strokes of all the blow molds 20 can be matched.

The second blow base 32 is configured to slide along guide rods 36 fixed to the first blow base 31.

Guide rod holes 37 (37a to 37d) penetrating in the second direction are formed in the second blow base 32 via guide bushes or the like, and the guide rods 36 (36a to 36d) are inserted into the guide rod holes 37 (37a to 37d) (see FIG. 6, for example). In the present embodiment, four guide rod holes 37 are formed in each second blow base 32, and the guide rods 36 are inserted into the four guide rod holes 37, respectively (see FIG. 2, for example).

More specifically, two guide rod holes 37a, 37b are provided in the second blow base 32 on both outer sides of the blow mold 20 in the first direction. These guide rod holes 37a, 37b are formed to penetrate the fixing member 33 and the first pressure receiving member 34 constituting the second blow base 32.

Two guide rod holes 37c, 37d are provided at a predetermined interval, in the first direction, in the second blow base 32 on the lower side of the blow mold 20. The interval between the guide rod holes 37c, 37d is not particularly limited, but is preferably set as wide as possible.

The first pressure receiving member 34 is not provided below the blow mold 20 of the second blow base 32, but guide block 40 is provided at a portion corresponding to each of the guide rod holes 37c, 37d. That is, each of the guide rod holes 37c, 37d is provided to penetrate the guide block 40 fixed to the fixing member 33 constituting the second blow base 32.

The guide blocks 40 are formed to have a thickness the same as that of the first pressure receiving member 34 in the present embodiment. When the blow mold 20 is mold-clamped (mold-closed), the guide blocks 40 abut against each other and have a function of receiving the mold clamping force together with the first pressure receiving member 34 and the second pressure receiving member 35. The guide blocks 40 may not have a function of receiving the mold clamping force. That is, when the blow mold 20 is mold-clamped (mold-closed), a slight gap may be formed between the adjacent guide blocks 40.

One end side of the guide rod 36 inserted into the guide rod hole 37 is fixed to one of the first blow base 31A or the first blow base 31B, and the other end side of the guide rod 36 is a free end. In the present embodiment, the guide rods 36a, 36c inserted into the guide rod holes 37a, 37c are fixed to the first blow base 31A, and the guide rods 36b, 36d inserted into the guide rod holes 37b, 37d are fixed to the first blow base 31B (see FIGS. 2 to 5).

In FIG. 3, among the plurality of guide rods 36, only the guide rods 36a, 36c fixed to the first blow base 31A are indicated by dotted lines. In FIG. 4, among the plurality of guide rods 36, only the guide rods 36b, 36d fixed to the first blow base 31B are indicated by dotted lines.

More specifically, as shown in FIGS. 2 to 5, in the first blow base 31A, guide rod fixing holes (guide rod fixing portions) 38a, 38c, which respectively communicate with the guide rod holes 37a, 37c when the blow mold 20 is mold-clamped, are provided in vicinity of end portions of a pair of diagonal corners 311 (see FIG. 2). The guide rod fixing holes 38 are provided to penetrate at least the first pressure receiving member 34 constituting the first blow base 31A. The guide rod 36 is fixed to the fixing member 33 constituting the first blow base 31A in the guide rod fixing hole 38. Two guide rods 36a, 36c are fixed to the first blow base 31A, respectively near the end portions of the pair of diagonal corners 311.

In the first blow base 31A, guide rod holding holes (guide rod holding portions) 39 (39b, 39d), which respectively communicate with the guide rod holes 37b, 37d when the blow mold 20 is mold-clamped, are provided in vicinity of end portions of the other pair of diagonal corners 312 (see FIG. 2). Similar to the guide rod fixing holes 38, these guide rod holding holes 39b, 39d are provided to penetrate at least the first pressure receiving member 34. In this way, two guide rod holding holes 39b, 39d are provided in the first blow base 31A, respectively near the end portions of the other pair of diagonal corners 312.

Here, a structure of the first blow base 31A has been described, and the first blow base 31B has the same structure. That is, the guide rod fixing holes 38 (38b, 38d) and the guide rod holding holes 39 (39a, 39c) are provided in the first blow base 31B, and the guide rods 36 (36b, 36d) are fixed near the end portions of the pair of diagonal corners 312.

Therefore, when the blow mold 20 is mold-clamped, tip end portions of the guide rods 36a, 36c fixed to the first blow base 31A are slidably supported by the guide rod holding holes 39a, 39c formed in the second blow base 31B, and tip end portions of the guide rods 36b, 36d fixed to the second blow base 31B are slidably supported by the guide rod holding holes 39b, 39d formed in the first blow base 31A.

By providing such guide rods 36, when the blow bases 30 coupled by the coupling member 60 are slidably moved, the blow bases 30 (in particular, the second blow bases 32) are slidably moved along the guide rods 36 to be appropriately positioned. Therefore, the blow molds 20 can be opened and closed favorably.

In the present embodiment, the coupling member 60 is fixed to the first pressure receiving member 34 constituting the blow base 30, but may not necessarily be fixed to the first pressure receiving member 34. For example, as shown in FIG. 8, the coupling member 60 may be fixed to a fixing portion 42 of the blow base 30, which is independent of first pressure receiving members 34A.

In this example, the first pressure receiving members 34A are provided near an upper end portion and a lower end portion of each blow base 30. The fixing portion 42 independent of the first pressure receiving members 34A is provided at a center portion of the blow base 30 in an upper-lower direction, and the coupling member 60 is fixed to the fixing portion 42.

When mold clamping is performed, the first pressure receiving members 34A facing each other abut against each other to receive the mold clamping force. However, in a case of a structure shown in FIG. 8, an abutment surface (a tip end surface) of the first pressure receiving member 34A is relatively narrow. Therefore, preferably, a positioning mechanism is provided on the abutment surface of the first pressure receiving member 34A.

For example, preferably, a convex portion 341 is provided on an abutment surface of one first pressure receiving member 34A, and a concave portion 342 engaged with the convex portion 341 is provided on an abutment surface of the other first pressure receiving member 34A. A diameter of the convex portion 341 is preferably gradually decreased toward a tip end side, and an inner diameter of the concave portion 342 is preferably gradually increased toward an opening side. Thereby, when mold closing is performed, the first pressure receiving members 34A facing each other can abut against each other more reliably. The fixing portion 42 may not receive the mold clamping force during mold clamping, but the fixing portion 42 is desired to abut against the facing fixing portion 42 and receive the mold clamping force together with the first pressure receiving members 34.

The convex portion 341 and the concave portion 342 may have a structure the same as that of the guide rod 36 and the guide rod hole 37 described above. That is, the convex portion 341 may have a length reaching the concave portion 342 even when the blow mold 20 is mold-opened, the concave portion 342 may have a depth enough to penetrate the first pressure receiving member 34, and the convex portion 341 may slide in the concave portion 342 in accordance with the opening and closing operation of the blow mold 20.

In the present embodiment, the blow bases 30 are coupled by the coupling member 60, but the blow bases 30 may be coupled by a plurality of independent coupling members.

For example, as shown in FIG. 9, the first blow base 31A and the second blow bases 32A, 32B may be coupled by a first coupling member 60A, and the second blow bases 32C, 32D and the first blow base 31B may be coupled by a second coupling member 60B. Since the first coupling member 60A and the second coupling member 60B have the same structure, the first coupling member 60A will be described below, and description of the second coupling member 60B will be omitted.

The first coupling member 60A includes a fixed link 67 and a positioning member 68. The fixed link 67 is arranged along the second direction (a direction perpendicular to the parting surface 22a), and one end side of the fixed link 67 is fixed to the first blow base 31A. The other end side of the fixed link 67 is provided with a long hole 67a having a predetermined length along the second direction. The length of the long hole 67a is set in accordance with an interval between the first blow base 31A and the second blow base 32A, 32B when mold opening is performed.

The positioning member 68 has a columnar engagement portion 68a protruding outward from the second blow bases 32A, 32B in the first direction, and the engagement portion 68a is inserted into the long hole 67a of the fixed link 67. The engagement portion 68a is formed to have a diameter slightly smaller than an inner diameter (a short diameter) of the long hole 67a, and is slidably moved within the long hole 67a in accordance with sliding movement of the first blow base 31A. When the blow mold 20 is mold-closed, the engagement portion 68a is located near one end portion of the long hole 67a (see part (a) of FIG. 9).

When the mold opening of the blow mold 20 starts, first, the first blow base 31A slides and is separated from the second blow bases 32A, 32B. At this time, the fixed link 67 slides together with the first blow base 31A. Thereby, the engagement portion 68a of the positioning member 68 relatively slides to vicinity of the other end portion of the long hole 67a.

Thereafter, by continuing the sliding movement of the first blow base 31A, the engagement portion 68a of the positioning member 68 abuts against the fixed link 67, so that the second blow bases 32A, 32B are pulled together with the first blow base 31A via the fixed link 67 and the positioning member 68 to be separated from the second blow bases 32C, 32D (see part (b) of FIG. 9). The sliding movement of the first blow base 31A is stopped when the second blow bases 32A, 32B and the second blow bases 32C, 32D are at a predetermined interval.

In each blow mold 20, when the first split mold 25 and the second split mold 26 are mold-closed, each bottom mold 23 is lifted to close the bottom portion of the cavity 21.

Specifically, the blow molds 20 (20A to 20C) include push-up rods 27A to 27C, respectively, whose upper ends are fixed to bottom mold fixing plates 24 (24A to 24C) (see FIG. 2). In the present embodiment, four push-up rods 27A are provided to hang down in the first direction (an arrangement direction of the cavities 21) from the bottom mold fixing plate 24A. Similarly, four push-up rods 27B and four push-up rods 27C are provided to hang down from the bottom mold fixing plates 24B, 24C, respectively. As a result, in the second direction, three push-up rods 27A, 27B, 27C respectively hanging down from the bottom mold fixing plates 24 are arranged in a row, and four rows of push-up rods 27A, 27B, 27C are arranged. The number of push-up rods 27 hanging down from one bottom mold fixing plate 24 is not limited to four. The number of push-up rods 27 may be at least two, and may be appropriately increased or decreased according to molding conditions.

A lower end of the push-up rod 27 is located lower than each of the blow bases 30 (the first blow base 31 and the second blow base 32). As described above, each blow base 30 is provided on the spacer 50, and a space 70 is formed between the base board 11 and the blow base 30. The lower end of the push-up rod 27 is located in the space 70.

In the space 70, a push-up member 80 is provided at a position corresponding to the push-up rod 27. The push-up member 80 is a long plate-shaped member extending along the second direction, and a plurality of (four) the pushing-up members 80 are provided corresponding to the four push-up rods 27 hanging down from each bottom mole fixing plate 24. The push-up members 80 are provided so as to be abuttable against the three push-up rods 27A, 27B, 27C hanging down from the bottom fixing plates 24. That is, when the blow cavity molds 22 are mold-closed, the push-up members 80 are continuously provided in a region corresponding to the three push-up rods 27A, 27B, 27C arranged in a row in the second direction (see FIG. 3).

Each push-up member 80 is coupled to a lifting rod 201 of a lifting device 200 that includes, for example, a hydraulic cylinder or an electric motor (an actuator) and that is configured to lift the push-up member 80. Each push-up member 80 is lifted via the lifting rod 201 by operating the lifting device 200. The push-up rods 27 (27A, 27B, 27C) are pushed up by these push-up members 80, and accordingly, the bottom mold fixing plates 24 (24A, 24B, 24C) are also lifted. Thereby, the plurality of bottom molds 23 fixed to each bottom mold fixing plate 24 are lifted at a time to close bottom portions of the cavities 21.

Here, the lower end of the push-up rod 27 is not coupled to the push-up member 80 and is a free end. When the bottom mold fixing plate 24 and the push-up members 80 are lowered to a first position (an initial position), a gap is formed between the lower end of the push-up rod 27 and the push-up member 80 (see FIG. 3).

When the bottom portion of the cavity 21 is mold-closed, the push-up member 80 is lifted from this state. After being slightly lifted, the push-up members 80 abut against the push-up rods 27A, 27B, 27C hanging down from the bottom mold fixing plates 24 to lift these push-up rods 27A, 27B, 27C. Thereby, the bottom mold fixing plates 24A, 24B, 24C together with the push-up members 80 are lifted to a second position. The plurality of bottom molds 23 fixed to each bottom mold fixing plate 24 are lifted at a time to close the bottom portions of the cavities 21 (see FIG. 4).

A bottom mold guide member 28 is provided on a lower side of each bottom mold fixing plate 24. When the bottom mold fixing plate 24 is lowered to the first position (the initial position), the bottom mold fixing plate 24 is placed and held on the bottom mold guide member 28. That is, the first position (the initial position) of the bottom mold fixing plate 24 is defined by the bottom mold guide member 28.

The bottom mold guide member 28 is fixed to each of the first blow base 31B and the second blow bases 32A, 32C. In the present embodiment, two bottom mold guide members 28 are fixed to each of the first blow base 31B and the second blow bases 32A, 32C. Each bottom mold guide member 28 is arranged at a position corresponding to the push-up rod 27. Therefore, a rod insertion hole 28a into which the push-up rod 27 is inserted is formed in each bottom mold guide member 28 (see FIG. 2, for example).

The bottom mold guide member 28 may not necessarily be provided to the first blow base 31B and the second blow bases 32A, 32C. The bottom mold guide member 28, for example, may be provided to the first blow base 31A and the second blow base 32B, 32D, or may be provided to each of the first blow bases 31A, 31B and the second blow bases 32A to 32D.

Each bottom mold fixing plate 24 is coupled to a lowering device 90 that includes, for example, a pneumatic cylinder (an actuator) or a spring (a biasing member), and that lowers the bottom mold fixing plate 24 (see FIG. 2). In the present embodiment, the lowering device 90 is fixed on the second pressure receiving member 35 described above, and one end portion (a tip end portion) of the lowering device 90 is coupled to the bottom mold fixing plate 24. The lowering device 90 may not necessarily be fixed on the second pressure receiving member 35, and may be fixed to the fixing member 33 constituting the first blow base 31 or the second blow base 32, for example.

The lowering device 90 lowers the bottom mold fixing plate 24 lifted by the lifting device 200 by applying a pressure, to the bottom mold fixing plate 24, weaker than that of the lifting device 200 of the blow molding unit 5. For example, in the present embodiment, the lowering device 90 is always operated. Therefore, the bottom mold fixing plate 24 is lifted from the first position (the initial position) to the second position by operating the lifting device 200, and is lowered to the first position by the pressure applied by the lowering device 90 or the own weight by stopping operation of the lifting device 200.

As described above, in a configuration of the present embodiment, the plurality of bottom molds 23 corresponding to the cavities 21 are lifted by pushing up the push-up rods 27 by the push-up members 80. Therefore, the plurality of bottom molds 23 corresponding to the three rows of cavities 21 can be lifted at a time with the relatively simple configuration.

The number of push-up members 80 and the number of push-up rods 27 that hangs down from one bottom mold fixing plate 24 may not necessarily be the same. For example, the push-up member 80 may be configured to simultaneously push up a plurality of (for example, two) push-up rods 27 arranged side by side in the first direction.

A lower end surface of each second blow base 32 is provided with notches 100 at positions facing the push-up members 80 (see FIG. 2). That is, portions of the lower end surface of the second blow base 32 facing the push-up members 80 are located higher than portions of the lower end surface of the second blow base 32 abutting against the spacers 50.

Thereby, the space 70, which is a gap between the base board 11 and the second blow base 32, can be ensured to have a sufficient height. Therefore, the lifting device 200 can easily lift the bottom mold fixing plate 24 (the push-up rods 27) to a desired height.

As described above, the push-up rod 27 and the push-up member 80 are not coupled to each other. When the bottom mold fixing plate 24 is lowered to the first position, the push-up rod 27 is lowered until the gap is formed between the push-up rod 27 and the push-up member 80. Thereby, the blow molds 20 can be relatively easily attached and detached. Therefore, for example, work efficiency during replacement of the bottom mold 23, the bottom mold fixing plate 24, the push-up member 80 and the like can be improved, and work time can be shortened.

The blow molding mold unit 10 according to the present embodiment includes, for example, a movement jig (a transfer jig) 500 and a coupling jig 600 that are used for placing (moving) on the base board 11 in a detachable manner.

For example, as shown in FIG. 10, the movement jig 500 includes: a main body member 501 having a substantially L-shape extending in the upper-lower direction; and a support member 502 swingably supporting the main body member 501. The main body member 501 is attached to the support member 502, at a predetermined interval from the support member 502, by a support pin 503 near a center portion of the main body member 501 in the upper-lower direction.

The main body member 501 includes a roller (a rolling member) 504 for movement (conveyance) at a lower end portion of the main body member 501. A female screw hole 505 penetrating in the first direction is formed at an upper end portion of the main body member 501. An adjustment member 506 such as a bolt that adjusts a gap between the main body member 501 and the support member 502 is mounted in the female screw hole 505.

The support member 502 includes a plate-shaped attachment plate portion 507 attached to the blow base 30, and a pair of protruding portions 508 protruding from the attachment plate portion 507, and is attached to each of the blow bases 30 (31, 32) by a fastening member 509 such as a bolt. The main body member 501 is swingably attached to the protruding portions 508 of the support member 502 by the support pin 503.

When the blow molding mold unit 10 is moved, such a movement jig 500 is attached to two positions on each of both side surfaces of the blow molding mold unit 10, and thus, the movement jig 500 is attached to four positions in total.

As shown in FIG. 11, the coupling jig 600 is attached across two blow bases 30 to which a pair of the first split mold 25 and the second split mold 26 are fixed so as to prevent mold opening of the blow molds 20. In the present embodiment, the coupling jig 600 is attached to three positions near each of an upper end portion and a lower end portion of the blow molding mold unit 10 on each of both side surfaces. That is, twelve coupling jigs 600 in total are attached to the blow molding mold unit 10, six coupling jigs 600 being attached to one side surface.

Each of the coupling jigs 600 is, for example, a plate-shaped member, and is attached to each of the blow bases 30 (31, 32) by a fastening member 601 such as a bolt. However, four of the coupling jigs 600 also function as the attachment plate portion 507 of the support member 502 constituting the movement jig 500. That is, the attachment plate portion 507 of the support member 502 is attached to the two blow bases 30 to which the pair of the first split mold 25 and the second split mold 26 is fixed, and also serves as the coupling jig 600.

The blow molding mold unit 10 is moved in the following procedure by using the movement jig 500 and the coupling jig 600.

First, as described above, the coupling jig 600 is attached to the blow molding mold unit 10 to prevent the mold opening. Thereafter, the four movement jigs 500 are attached to the blow molding mold unit 10. That is, the main body member 501 including the roller 504 for movement is attached to each support member 502 serving also as the coupling jig 600 by the support pin 503.

At this time, as shown in part (a) of FIG. 12, each main body member 501 is attached to the support member 502 in a state in which the roller 504 at the lower end portion comes into contact with a floor surface and in which the interval between the main body member 501 and the support member 502 is substantially constant in the upper-lower direction.

When the main body member 501 is attached to the support member 502, the adjustment member 506 is operated so as to widen a gap between the upper end portion of the main body member 501 and the support member 502. That is, the adjustment member 506 is advanced toward the support member 502 to widen the gap between the upper end portion of the main body member 501 and the support member 502.

A distance between the support pin 503 and the roller 504 is longer than a height from the floor surface to the support pin 503. Therefore, when the main body member 501 rotates about the support pin 503 as a fulcrum in accordance with an operation of the adjustment member 506, the blow molding mold unit 10 is lifted upward as shown in part (b) of FIG. 12. By performing the same operation on each of the four movement jigs 500, the blow molding mold unit 10 is supported by the four movement jigs 500 on the floor surface.

In this state, the blow molding mold unit 10 carried on a blow mold movement table (not shown) by a crane or the like can be moved, for example, on the blow mold movement table or the base board 11, and can be relatively easily moved between the two mold clamping plates 45 at installation positions.

After the blow molding mold unit 10 is moved to the installation position, the adjustment member 506 of each movement jig 500 is operated again to narrow the gap between the upper end portion of the main body member 501 and the support member 502, whereby the blow molding mold unit 10 can be easily installed on the base board 11.

After the blow molding mold unit 10 is fixed to the mold clamping plates 45, fastening members 509, 601 are removed, and the movement jigs 500 are removed from the blow bases 30 together with the coupling jigs 600. Thereby, a plurality of rows of blow molds and bottom molds can be relatively easily carried into a predetermined installation position of the blow molding device, and relatively easily carried out from the installation position, in an integrated manner.

Although one embodiment according to the present invention has been described above, the present invention is not limited to the above-described embodiment. The present invention can be appropriately modified without departing from the scope thereof.

For example, in the above-described embodiment, the blow molding mold unit is configured to include three rows of cavities, but the blow molding mold unit may, of course, include four or more rows of cavities. The present invention is also particularly effective in a configuration having an odd number of rows of cavities that require movement of all blow bases.

The present invention is also particularly effective when applied to a so-called one-step type blow molding device, and can of course be applied to a two-step type blow molding device.

REFERENCE SIGNS LIST 1 blow molding device
2 machine base
3 injection molding unit
4 temperature adjustment unit
5 blow molding unit
6 removing unit
7 injection device
8 rotation disk
9 lip mold
10 blow molding mold unit
11 base board
20 blow mold
21 cavity
22 blow cavity mold
22a parting surface
23 bottom mold
24 bottom mold fixing plate
25 first split mold
26 second split mold
27 push-up rod
28 bottom mold guide member
28a rod insertion hole
30 blow base
31 first blow base
32 second blow base
33 fixing member
34 first pressure receiving member
35 second pressure receiving member
36 guide rod
37 guide rod hole
38 guide rod fixing hole
39 guide rod holding hole
40 guide block
42 fixing portion
45 mold clamping plate
50 spacer
55 slide metal
60 coupling member
60A first coupling member
60B second coupling member
61 first link arm
62 second link arm
63 third link arm
64 first shaft member
65 second shaft member
66 rotation member
67 fixed link
67a long hole
68 positioning member
68a engagement portion
70 space
80 push-up member
90 lowering device
100 notch
200 lifting device
201 lifting rod
341 convex portion
342 concave portion
500 movement jig
501 main body member
502 support member
503 support pin
504 roller
505 female screw hole
506 adjustment member
507 attachment plate portion
508 protruding portion
509 fastening member
600 coupling jig
601 fastening member

The invention claimed is:

1. A blow molding mold that includes a blow mold including: a pair of split molds forming a plurality of cavities arranged in a row in a first direction; a plurality of bottom molds respectively corresponding to the cavities; and a bottom mold fixing plate to which the plurality of bottom molds are fixed, the blow molding mold comprising:
at least three blow molds arranged in a second direction perpendicular to the first direction;
first base members holding split molds that are arranged at both end positions in the second direction, the first base members being fixed to a mold clamping plate;
second base members arranged between the first base members; and
a coupling member configured to couple the first base members and the second base members in a state where the pair of split molds are contactable with and separable from each other,
wherein the second base members are configured to move in accordance with movement of the first base members, and
wherein a moving distance of each second base member is shorter than that of each first base member when the blow molds are opened or closed.

2. The blow molding mold according to claim 1, wherein the second base members hold two adjacent split molds in a back-to-back state.

3. The blow molding mold according to claim 1, further comprising:
a push-up rod hanging down from the bottom mold fixing plate of each of the blow molds; and
a push-up member configured to be coupled to a lifting device and extending along the second direction below the second base members, the push-up member being abuttable against a lower end of the push-up rod of each of the plurality of the blow molds.

4. The blow molding mold according to claim 3, wherein a plurality of the push-up rods are provided to each bottom mold fixing plate in the first direction, and wherein a plurality of the push-up members are provided corresponding to the plurality of the push-up rods.

5. The blow molding mold according to claim 3, wherein the push-up rod and the push-up member are arranged such that a gap is formed therebetween when the push-up rod and the push-up member are lowered.

6. The blow molding mold according to claim 3, further comprising:
a lowering device configured to lower the bottom mold fixing plate.

7. The blow molding mold according to claim 6, wherein the lifting device is configured to lift the push-up member by a hydraulic pressure, and wherein the lowering device is configured to lower the bottom mold fixing plate by a pneumatic pressure.

8. A blow molding mold that includes a blow mold including: a pair of split molds forming a plurality of cavities arranged in a row in a first direction; a plurality of bottom molds respectively corresponding to the cavities; and a bottom mold fixing plate to which the plurality of bottom molds are fixed, the blow molding mold comprising:
a plurality of the blow molds arranged in a second direction perpendicular to the first direction;
first base members holding split molds that are arranged at both end positions in the second direction, the first base members being fixed to a mold clamping plate;
second base members arranged between the first base members, and to which split molds other than the split molds fixed to the first base members are fixed;
a coupling member configured to couple the first base members and the second base members in a state where the pair of split molds are contactable with and separable from each other,
a push-up rod hanging down from the bottom mold fixing plate of each of the blow molds; and
a push-up member configured to be coupled to a lifting device and extending along the second direction below the second base members, the push-up member being abuttable against a lower end of the push-up rod of each of the plurality of the blow molds,
wherein the second base members are configured to move in accordance with movement of the first base members, and
wherein a bottom portion of the second base members is provided with a notch at a position corresponding to the push-up member.

9. A blow molding device comprising the blow molding mold according to claim 1.

10. The blow molding mold according to claim 1, wherein the second base members include a first pair of second base members and a second pair of second base members, the first and second pair of second base members arranged between the first base members.

11. The blow molding mold according to claim 10, wherein the first pair of second base members hold a first pair of adjacent split molds in a first back-to-back state, and the second pair of second base members holds a second pair of adjacent split molds in a second back-to-back state.

* * * * *